United States Patent
Chiang

(10) Patent No.: US 9,594,355 B2
(45) Date of Patent: Mar. 14, 2017

(54) WIRELESS MONITORING METHOD AND DEVICE THEREOF

(71) Applicant: EVERSPRING INDUSTRY CO., LTD., New Taipei (TW)

(72) Inventor: Chien-Ming Chiang, New Taipei (TW)

(73) Assignee: EVERSPRING INDUSTRY CO., LTD., New Taipei (TW)

( * ) Notice: Subject to any disclaimer, the term of this patent is extended or adjusted under 35 U.S.C. 154(b) by 172 days.

(21) Appl. No.: 14/090,784

(22) Filed: Nov. 26, 2013

(65) Prior Publication Data

US 2015/0145640 A1    May 28, 2015

(51) Int. Cl.
| | | |
|---|---|---|
| G05B 1/03 | (2006.01) | |
| G08B 25/00 | (2006.01) | |
| G08B 25/10 | (2006.01) | |
| G08B 29/18 | (2006.01) | |
| G08B 17/00 | (2006.01) | |

(52) U.S. Cl.
CPC ............. G05B 1/03 (2013.01); G08B 25/003 (2013.01); G08B 25/10 (2013.01); G08B 29/188 (2013.01); *G08B 17/00* (2013.01); *G08B 25/009* (2013.01)

(58) Field of Classification Search
None
See application file for complete search history.

(56) References Cited

U.S. PATENT DOCUMENTS

| | | | | |
|---|---|---|---|---|
| 5,543,778 A | * | 8/1996 | Stouffer | 340/539.14 |
| 5,594,428 A | * | 1/1997 | Peterson | 340/12.22 |
| 6,553,336 B1 | * | 4/2003 | Johnson et al. | 702/188 |
| 7,554,445 B2 | * | 6/2009 | Script et al. | 340/545.1 |
| 7,629,880 B2 | * | 12/2009 | Stilp et al. | 340/508 |
| 8,193,930 B2 | * | 6/2012 | Petite et al. | 340/539.1 |
| 8,194,695 B2 | | 6/2012 | Kim et al. | |
| 2005/0055417 A1 | | 3/2005 | Reich et al. | |
| 2006/0220834 A1 | | 10/2006 | Maeng | |
| 2007/0182584 A1 | | 8/2007 | Ogino | |
| 2011/0310770 A1 | | 12/2011 | Liang et al. | |
| 2012/0182143 A1 | | 7/2012 | Gaines et al. | |

FOREIGN PATENT DOCUMENTS

| | | |
|---|---|---|
| GB | 2443021 A | 4/2008 |
| JP | 2002291039 A | 10/2002 |
| JP | 2004328333 A | 11/2004 |
| JP | 2011103542 A | 5/2011 |

\* cited by examiner

*Primary Examiner* — K. Wong
(74) *Attorney, Agent, or Firm* — Muncy, Geissler, Olds & Lowe, P.C.

(57) ABSTRACT

A wireless monitoring method is implemented through a plurality of wireless monitor devices. Each of the plurality of wireless monitor devices includes a state detection unit to produce a state data, a micro control unit and a communication module. To implement the wireless monitoring method, the wireless monitoring device gets a device identification code of another wireless monitoring device in a connection range thereof, and judges whether the device identification code is stored therein and belongs to a monitor group. If the judging outcome is positive, the wireless monitoring device gets another state data of the another wireless monitoring device. After judging the state data and the another state data meet a state control condition, at least one control signal is output to trigger at least one electronic device.

8 Claims, 4 Drawing Sheets

WIRELESS MONITORING METHOD AND DEVICE THEREOF

FIELD OF THE INVENTION

The present invention relates to a wireless monitoring method and device thereof and particularly to a wireless monitoring method that sets a plurality of wireless monitor devices as a monitor group by storing device identification codes to monitor in a hybrid fashion.

BACKGROUND OF THE INVENTION

Household life quality is an important issue to most people. In recent years drastic lifestyle change and technology innovation take place. As a result, the nearby protection or services that are provided by man-power in the past have gradually evolved into remote security and management practices by incorporating with monitoring systems and monitoring software. Take the present monitoring system for instance. Before establishing the monitoring system the intended monitoring area has to be divided into a plurality of monitoring zones. Each monitoring zone has at least one detection device installed with function matching the requirement of the monitoring zone. Each detection device forms an information connection with a system host through a line telephone loop to transmit an environmental signal generated by detection to the system host. The system host judges the received environmental signals to confirm whether an abnormal condition occurs and generation of an alarm signal is needed. Reference of such techniques can be found in U.S. Pat. No. 8,194,695 and U.S. publication No. 2011310770.

While the centralized management through the system host can provide desired management and control on the monitor end, whether the line telephone loop functions normally or not cannot be controlled by the monitor end. In the event that disruption happens to the line telephone loop the service of the monitoring system is disabled. In addition, the number of connection that the system host can made at the same time is limited by the bandwidth of the line telephone loop. Hence when connection busy happens the system host cannot timely and securely receive the environmental signals from the detection devices. Aside from the constraint of bandwidth of the line telephone loop, when the number of the environmental signals received by system host has reached a certain amount, the operation capacity of the system host could be overloaded and result in unable to generate the alarm signals instantly as desired, therefore violating the original goal of enhancing household life quality. Furthermore, connecting each detection device with the system host through the line telephone loop also makes wiring in the monitoring zones complicated, and could cause difficulty on inspection and repairs.

SUMMARY OF THE INVENTION

The primary object of the present invention is to solve the problems of installation difficulty and unchangeable issue occurred to the conventional monitoring system.

To achieve the foregoing object the present invention provides a wireless monitoring method that comprises the steps of:

Step 1: providing a first wireless monitoring device and at least two second wireless monitoring devices to detect respectively ambient states and output respectively first state data and second state data respectively, each of the at least two second wireless monitoring devices including a device identification code;

Step 2: registering at least two device identification (ID in short hereinafter) codes of the second wireless monitoring devices in the first wireless monitoring device, and setting the first wireless monitoring device and the second wireless monitoring device whose device identification code has been registered as a monitor group;

Step 3: setting a state monitor condition in the first wireless monitoring device and outputting at least one control signal when the state monitor condition is met;

Step 4: using the first wireless monitoring device to detect the at least two second wireless monitoring device within a connection range thereof and judging whether the device ID codes of the at least two second wireless monitoring devices are registered in the first wireless monitoring device to belong to the monitor group; if the judging outcome is positive, letting the first wireless monitoring device receive the second state data output from the second wireless monitoring devices; and Step 5: using the first wireless monitoring device to judge whether the first state data and the second state data meet the state monitor condition, and letting the first wireless monitoring device output the at least one control signal to trigger at least one electronic device when the state monitor condition is met.

In one embodiment, the step 4 further includes the substeps as follows: sending information connection requests from the first wireless monitoring device to the at least two second monitoring devices; getting the device ID codes and connection address codes of the at least two second wireless monitoring device when the at least two second wireless monitoring devices respond the information connection requests; judging whether the device ID codes of the at least two second wireless monitoring devices are registered in the first wireless monitoring device to belong to the monitor group; if the judging outcome is positive, letting the first wireless monitoring device connect with the second wireless monitoring devices according to the connection address codes.

In another embodiment, the first wireless monitoring device includes a first state detection unit for detecting state changes, a micro control unit connected to the first state detection unit and saving the at least two device identification codes of the second wireless monitoring devices and the state monitor condition, and a communication module connected to the micro control unit and communicating with the second wireless monitoring device, while the second wireless monitoring device includes a second state detection unit.

In yet another embodiment, the first state detection unit can be selected from the group consisting of a temperature sensor, a smoke sensor, a vibration sensor, a movement sensor, an electric conductivity sensor, a blood pressure sensor, a blood sugar sensor, a heartbeat sensor and a sound sensor.

In yet another embodiment, the second state detection unit can be selected from the group consisting of a temperature sensor, a smoke sensor, a vibration sensor, a movement sensor, an electric conductivity sensor, a blood pressure sensor, a blood sugar sensor, a heartbeat sensor and a sound sensor.

In addition to the aforesaid wireless monitoring method, the invention also provides a wireless monitoring device which comprises a state detection unit, a communication module and a micro control unit. The state detection unit detects ambient states and outputs state data. The communication module connects wirelessly with other wireless monitoring devices to output the state data and receive other state data from the other wireless monitoring device. The micro control unit electrically connects with the state detection unit to receive the state data and stores a plurality of device ID codes of the other wireless monitoring devices, and outputs a control signal when judging that the state data and the other state data meet the state monitor condition.

In yet another embodiment, the communication module can adopt a communication protocol which is selected from the group consisting of IEEE802.15.1, IEEE802.11 and IEEE802.15.4.

In yet another embodiment, the state detection unit can be selected from the group consisting of a temperature sensor, a smoke sensor, a vibration sensor, a movement sensor, an electric conductivity sensor, a blood pressure sensor, a blood sugar sensor, a heartbeat sensor and a sound sensor.

The method and structure of the invention, compared with the conventional techniques, provides features as follows:

1. By directly connecting with multiple of the wireless monitoring devices and exchanging state data, the invention can judge whether the state monitor condition is met to output the control signal. Hence there is no need of relaying through a security system host that occurs to the conventional monitoring system. As a result, security failure caused by malfunction of the security system host or line disruption can be avoided.

2. By exchanging information through wireless communication technique between two wireless monitoring devices, the problem of complex wiring occurred to the convention monitoring system implemented by line telephone loop can be averted.

3. By registering the device ID code in the wireless monitoring device, the other wireless monitoring devices in the monitor group can securely establish connection with the wireless monitoring device to generate interactive monitoring. Moreover, by storing the device ID codes in advance users can add other wireless monitoring devices which have been registered in the wireless monitoring device according to implementation requirements.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
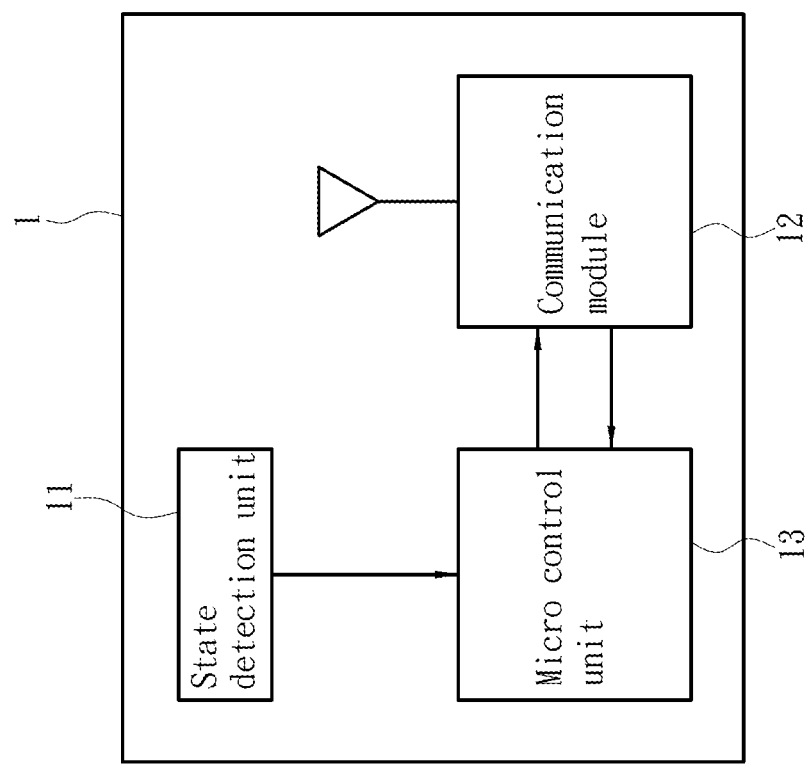
FIG. 1 is a block diagram of the devices used in the wireless monitoring method of the invention.

The wireless monitoring method and device according to the invention is implemented through a plurality of wireless monitoring devices installed in a same monitoring zone to generate a hybrid monitoring effect. Please referring to FIG. 1, the wireless monitoring device 1 comprises a state detection unit 11, a communication module 12 and a micro control unit 13. The state detection unit 11 detects ambient states in normal conditions and outputs a state data. The ambient states can be state variations within the monitoring zone or physiological information of a user within the monitoring zone. The state data is a detection result corresponding to the state variations (or physiological information). More specifically, the state detection unit 11 can be a temperature sensor, a smoke sensor, a vibration sensor, a movement sensor, an electric conductivity sensor, a blood pressure sensor, a blood sugar sensor, a heartbeat sensor or a sound sensor. The communication module 12 forms an information connection with another state detection unit 11 so that the two state detection units 11 can the form information connection in the normal conditions to exchange state data. The communication module 12 can adopt many types of communication techniques, such as IEEE802.15.1 communication protocol, IEEE802.11 communication protocol or IEEE802.15.4 communication protocol. The micro control unit 13 is commonly called MCU in short and connects with the state detection unit 11 and the communication module 12. The micro control unit 13 saves a plurality of device ID codes and a state monitor condition. Each of the plurality of device ID code corresponds to one wireless monitoring device 1, and another wireless monitoring device 1 whose device ID code is registered in the wireless monitoring device 1 belongs to a monitor group with the wireless monitoring device 1. The wireless monitoring device 1 in practice stores merely the device ID codes which belong to the monitor group. In other words, not every wireless monitoring device 1 within the monitoring zone is set to belong the monitor group. The monitor group can be adjusted and set according to monitor purpose. Furthermore, the micro control unit 13 can also register connection address codes of every wireless monitoring devices 1 in the monitor group so that the communication module 12 can establish information connections with the corresponding wireless monitoring devices 1 according to the connection address codes. The state monitor condition can be a judgmental formula based on the state data. It judges whether the state data conform to the limitations thereof. If the outcome is positive, at least one control signal is outputted to activate at least one electronic device to operation.

Figure 2:
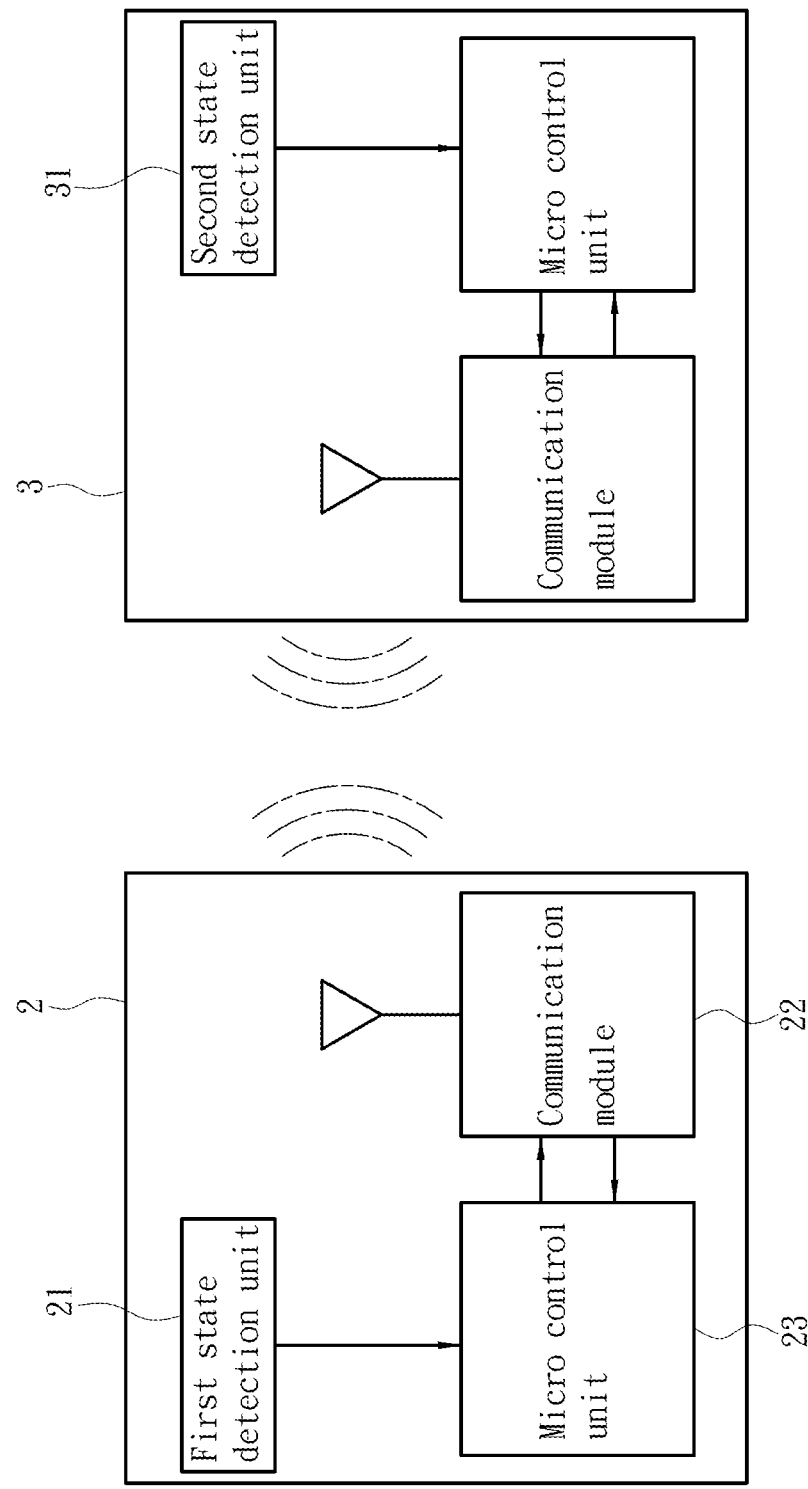
FIG. 2 is a schematic view of devices in an embodiment of the wireless monitoring method of the invention.
Figure 3:
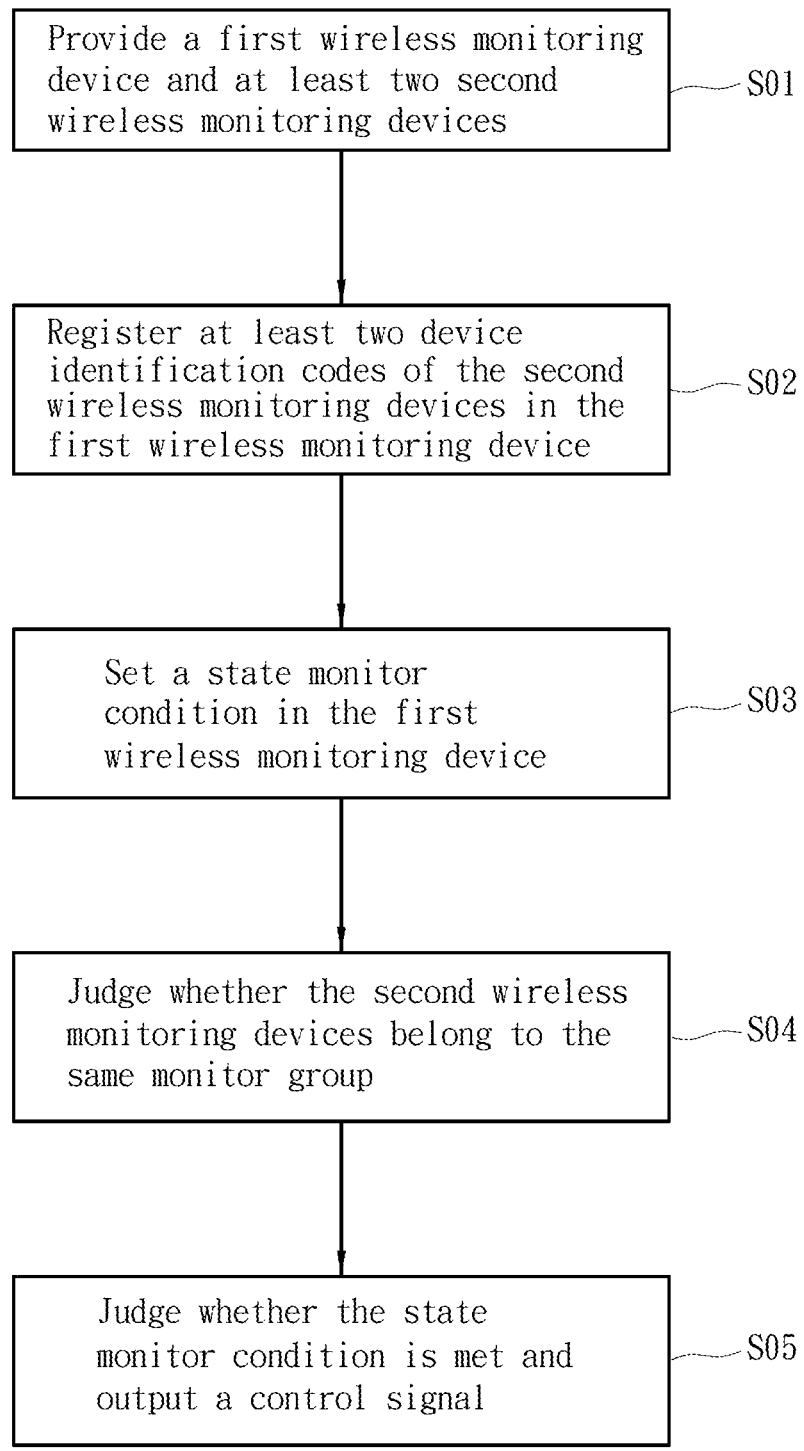
FIG. 3 is a flowchart of an embodiment of the wireless monitoring method of the invention.

To facilitate discussion of the monitoring method of the invention without misunderstanding of the meaning of multiple wireless monitoring device 1, the wireless monitoring device 1 herein are divided into a first wireless monitoring device 2 and at least two second wireless monitoring device 3 (as shown in FIG. 2). Also referring to FIG. 3, the wireless monitoring method of the invention includes the steps as follows:

Step 1 (S01): providing the first wireless monitoring device 2 and at least two second wireless monitoring device 3 to detect ambient states and output respectively first state data and second state data, each of the at least two second wireless monitoring devices including a device identification code;

Step 2 (S02): registering at least two device ID codes of the second wireless monitoring devices 3 in the first wireless monitoring device 2, and setting the first wireless monitoring device 2 and the second wireless monitoring device 3 whose device identification code has been registered as a monitor group;

Step 3 (S03): setting a state monitor condition in the first wireless monitoring device 2 and outputting a control signal when the state monitor condition is met;

Step 4 (S04): using the first wireless monitoring device 2 to detect the at least two second wireless monitoring devices 3 within a connection range of the first wireless monitoring device 2, and judging whether the device ID codes of the at least two second wireless monitoring devices 3 are registered in the first wireless monitoring device 2 to belong to the monitor group; if the judging outcome is positive, letting the first wireless monitoring device 2 receive the second state data output from the second wireless monitoring devices 3; and Step 5 (S05): using the first wireless monitoring device 2 to judge whether the first state data and the second state data meet the state monitor condition, and letting the first wireless monitoring device 2 output the at least one control signal to trigger at least one electronic device.

An embodiment is provided as follow to facilitate discussion of implementation of the wireless monitoring method mentioned above. First, the first wireless monitoring device 2 and at least two second wireless monitoring device 3 are installed within the monitoring zone (such as a household environment). The first wireless monitoring device 2 includes a first state detection unit 21 which can be a temperature sensor, a smoke sensor, a vibration sensor, a movement sensor, an electric conductivity sensor, a blood pressure sensor, a blood sugar sensor, a heartbeat sensor or a sound sensor. The second wireless monitoring device 3 includes a second state detection unit 31 which also can be a temperature sensor, a smoke sensor, a vibration sensor, a movement sensor, an electric conductivity sensor, a blood pressure sensor, a blood sugar sensor, a heartbeat sensor or a sound sensor. In this embodiment, for example, the monitoring zone is a kitchen, the first state detection unit 21 is a temperature sensor, and the second state detection unit 31 is a smoke sensor. Then, at least two device ID codes of the second wireless monitoring device 3 are registered in the first wireless monitoring device 2 and the corresponding second wireless monitoring devices 3 are set as a monitor group with the first wireless monitoring device 2. The first wireless monitoring device 2 not only stores the device ID code of every the second wireless monitoring device 3 currently in used, also can include the device ID codes of additional second wireless monitoring devices 3 that could be possibly added to the same monitor group. After step 2 (S02) is finished, proceed step 3 (S03) to set the state monitor condition on the first monitoring device 2. The state monitor condition, in this embodiment, is conditions for judging whether a conflagration occurs in the monitoring zone (kitchen), such as smoke concentration and existing temperature of the kitchen. At step 4 (S04), the first wireless monitoring device 2 gets the device ID code of each second wireless monitoring device 3 within the connection range, and judges whether the received device ID code is stored in the first wireless monitoring device 2; if the judging outcome is positive, the first wireless monitoring device 2 receives the second state data output from the second wireless monitoring device 3 in normal conditions. At step 4 (S04), if the first wireless monitoring device 2 detects the device ID code that is not stored therein, the first wireless monitor device 2 does not receive the data transmitted from the corresponding second wireless monitoring device 3. Finally, at step 5 (S05), the monitoring method of the invention enters a monitoring stage. The first wireless monitoring device 2 detects the monitoring zone and generates the first state data in the normal conditions and gets the second state data output by any second wireless monitoring device 3 belonged to the monitor group, and judges whether the first state data and the second state data meet the state monitor condition. If the judging outcome is positive, the first wireless monitoring device 2 outputs at least one control signal to trigger at least one electronic device to alert users happening of incidents or to take actions immediately. The electronic device can be a device capable of performing corresponding actions when an incident happens.

Figure 4:
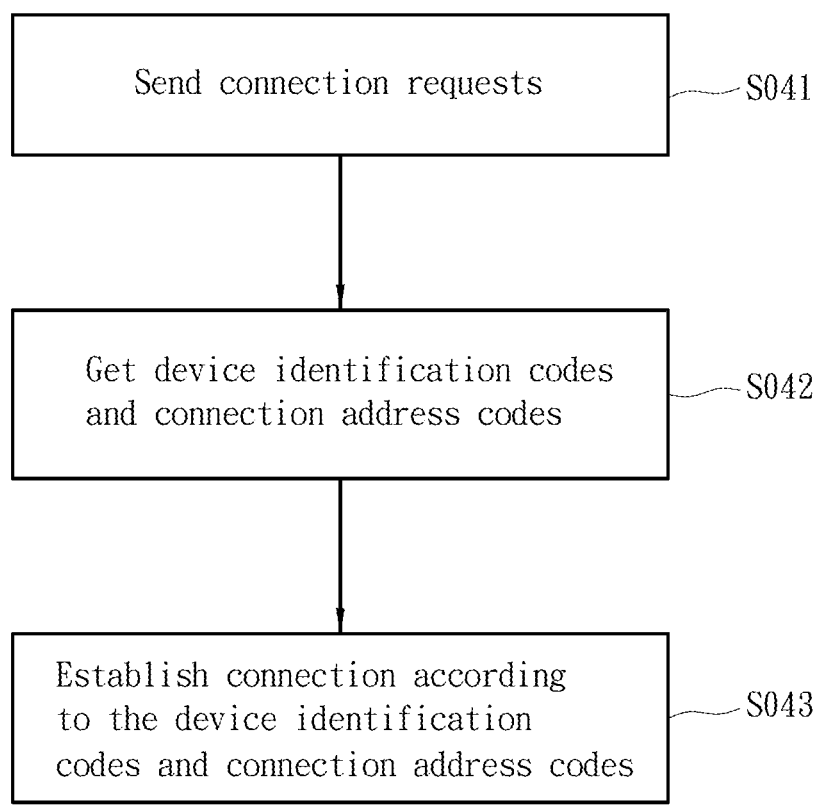
FIG. 4 is a flowchart of sub-steps of step 4 in an embodiment of the wireless monitoring method of the invention.

Please refer to FIG. 4 for the sub-steps (S041-S042) of the step 4 (S04) previously discussed. After the first and second wireless monitoring devices 2 and 3 have been installed in the monitoring zone, the first wireless monitoring device 2 sends information connection requests to the at least two second wireless monitoring devices 3 in the monitoring zone. After the at least two second wireless monitoring devices 3 have responded the information connection request, the first wireless monitoring device 2 gets the device ID codes and connection address data of the at least two second wireless monitoring devices 3, and judges whether the device ID codes are stored therein. If the judging outcome is positive, the communication module 22 of the first wireless monitoring device 2 connects with the second wireless monitoring devices 3 according to the connection address codes.

As a conclusion, the wireless monitoring method provided by the invention is implemented through a plurality of wireless monitoring devices. Each of the wireless monitoring devices includes a state detection unit to produce a state data, a micro control unit and a communication module. During implementation, first, the wireless monitoring device gets a device ID code of another wireless monitoring device within a connection range thereof, and judges whether the device ID code is stored therein and belongs to a monitor group. If the judging outcome is positive, the wireless monitoring device gets another state data from the another wireless monitoring device and judges whether the state data and the another state data meet a state control condition, and outputs at least one control signal to trigger at least one electronic device when the result is positive.

What is claimed is:

1. A wireless monitoring method, comprising the steps of:
    Step 1: providing a plurality of wireless monitoring devices to detect ambient states and respectively output state data, each of the plurality of wireless monitoring devices including a device identification code;
    Step 2: arranging the wireless monitoring devices to form a monitor group by reciprocally registering the device identification codes of the plurality of wireless monitoring devices in each of the wireless monitoring devices;
    Step 3: setting a state monitor condition in each of the wireless monitoring devices and outputting at least one control signal when the state data of any one of the wireless monitoring devices satisfies the state monitor condition;
    Step 4: using one of the wireless monitoring devices to detect and obtain the device identification codes of other wireless monitoring devices within a connection range, judging whether the device identification codes of the other wireless monitoring devices belong to the monitor group, and if yes, letting the wireless monitoring device receive the state data which output from the other wireless monitoring devices within the same monitor group; and
    Step 5: using one of the wireless monitoring devices to judge whether these state data generated by the wireless monitoring device and obtained from the other wireless monitoring devices meet the state monitor condition, and if yes, letting the wireless monitoring device respectively output the at least one control signal to trigger at least one electronic device.

2. The wireless monitoring method of claim 1, wherein the step 4 further includes sub-steps of:
- sending information connection requests from every wireless monitoring device to the other wireless monitoring devices;
- receiving the device identification codes and connection address codes of the other wireless monitoring devices for every wireless monitoring device when the other wireless monitoring devices respond the information connection requests; and
- judging whether the device identification codes of the other wireless monitoring devices are registered in each wireless monitoring device as belonging to the monitor group, and letting every wireless monitoring device connect with the other wireless monitoring devices through the connection address codes when the judging outcome is positive.

3. The wireless monitoring method of claim 1, wherein each of the wireless monitoring devices includes a state detection unit for detecting state variations, a micro control unit connected to the state detection unit and saving the device identification codes of the other wireless monitoring devices and the state monitor condition, and a communication module connected to the micro control unit and communicating with the other wireless monitoring devices.

4. The wireless monitoring method of claim 3, wherein the state detection unit is selected from the group consisting of a temperature sensor, a smoke sensor, a vibration sensor, a movement sensor, an electric conductivity sensor, a blood pressure sensor, a blood sugar sensor, a heartbeat sensor and a sound sensor.

5. The wireless monitoring method of claim 3, wherein the state detection unit is selected from the group consisting of a temperature sensor, a smoke sensor, a vibration sensor, a movement sensor, an electric conductivity sensor, a blood pressure sensor, a blood sugar sensor, a heartbeat sensor and a sound sensor.

6. A monitor group of wireless monitoring devices, every wireless monitoring device comprising:
- a state detection unit detecting ambient states and outputting a state data;
- a communication module connecting wirelessly with other wireless monitoring devices in the monitor group; and
- a micro control unit which is electrically connected with the state detection unit to receive the state data and stores a plurality of device identification codes of the other wireless monitoring devices and a state monitor condition; and
- wherein one of the wireless monitoring devices outputs the state data to the other wireless monitoring devices and receives the other state data from the other wireless monitoring devices, the micro control unit judges whether all the state data meet the state monitor condition, one of the wireless monitoring devices outputs a control signal when judging that these state data meet the state monitor condition.

7. The monitor group of wireless monitoring devices of claim 6, wherein the communication module adopts a communication protocol selected from the group consisting of IEEE802.15.1; IEEE802.11 and IEEE802.15.4.

8. The monitor group of wireless monitoring devices of claim 6, wherein the state detection unit is selected from the group consisting of a temperature sensor, a smoke sensor, a vibration sensor, a movement sensor, an electric conductivity sensor, a blood pressure sensor, a blood sugar sensor, a heartbeat sensor and a sound sensor.

* * * * *